United States Patent
Weinberg et al.

(10) Patent No.: US 8,713,084 B2
(45) Date of Patent: Apr. 29, 2014

(54) METHOD, SYSTEM AND COMPUTER PROGRAM PRODUCT FOR VERIFYING FLOATING POINT DIVIDE OPERATION RESULTS

(75) Inventors: Joshua M. Weinberg, Bronx, NY (US); Martin S. Schmookler, Texas, TX (US)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 12/036,397

(22) Filed: Feb. 25, 2008

(65) Prior Publication Data
US 2009/0216823 A1    Aug. 27, 2009

(51) Int. Cl.
*G06F 7/44*    (2006.01)

(52) U.S. Cl.
USPC ............ 708/504; 708/490; 708/495; 708/650

(58) Field of Classification Search
None
See application file for complete search history.

(56) References Cited

U.S. PATENT DOCUMENTS

| | | | |
|---|---|---|---|
| 4,488,247 A * | 12/1984 | Inagami et al. | 708/654 |
| 4,878,190 A | 10/1989 | Darley et al. | |
| 5,046,038 A | 9/1991 | Briggs et al. | |
| 5,386,375 A | 1/1995 | Smith | |
| 5,386,376 A * | 1/1995 | Girard et al. | 708/656 |
| 5,615,113 A * | 3/1997 | Matula | 708/655 |
| 5,903,486 A | 5/1999 | Curtet | |
| 7,185,041 B1 | 2/2007 | End, III | |
| 2003/0050948 A1 | 3/2003 | Okawa | |

OTHER PUBLICATIONS

"IBM® z/Architecture Principles of Operation", Publication No. SA22-7832-05, 6th Edition, Apr. 2007. 1,215 pages separated into 4 electronic attachments.
Weinberg, et al., U.S. Appl. No. 12/036,387, Final Office Action, Mailed Oct. 5, 2011.
U.S. Appl. No. 12/037,207 Non-Final Office Action dated Mar. 3, 2011.
U.S. Appl. No. 12/037,408 Non-Final Office Action dated Mar. 7, 2011.
U.S. Appl. No. 12/036,387, Non-Final Office Action dated Mar. 30, 2011.
U.S. Appl. No. 121036,387 Final Office Action mailed Nov. 30, 2012.
U.S. Appl. No. 12/036,387 Non Final Office Action Mailed May 11, 2012.

* cited by examiner

*Primary Examiner* — Michael D Yaary
(74) *Attorney, Agent, or Firm* — Cantor Colburn LLP; John Campbell

(57) ABSTRACT

A method, system and computer program product for verifying a result of a floating point division operation are provided. The method includes: receiving a result of a floating point division operation for a dividend and a divisor; performing a comparison of a magnitude of a least significant bit (LSB) of the dividend and a magnitude of a most significant bit (MSB) of a remainder; and determining whether the result is correct based on the comparison.

15 Claims, 2 Drawing Sheets

US 8,713,084 B2

METHOD, SYSTEM AND COMPUTER PROGRAM PRODUCT FOR VERIFYING FLOATING POINT DIVIDE OPERATION RESULTS

BACKGROUND OF THE INVENTION

This invention relates generally to microprocessing, and more particularly to providing methods to improve floating point arithmetic operations.

In most processors, it is common to see some type of floating point unit (FPU) or other processing unit that completely implements (or at least has enhanced support for) various floating point divide instructions. Implementations of these instructions are based on popular division algorithms, including non-restoring SRT (Sweeney Robertson Tocher) division, Newton-Raphson division, Goldschmidt division and others.

Errors may occur during execution of these instructions using any of various algorithms, either due to errors in the design (including the algorithm itself) or due to circuit malfunctions such as manufacturing faults or rare environmental disturbances. Functional checking of these types of floating point divide algorithms and their results using formal verification techniques is not currently available, and such checking would only serve to eliminate design flaws, as opposed to malfunctions occurring during execution.

Accordingly, other techniques have been devised to try and verify the correctness of the algorithm and/or the result. For example, previous machines have focused on verifying the internal verifiable mathematical operations of the divide using parity and residue checks. While these techniques can verify the correctness of each internal operation, they do not speak to the correctness of the divide algorithm or final result.

Thus, it would be desirable to be able to detect errors in the final result of a floating point divide algorithm, particularly to detect errors occurring due to a circuit malfunction. Such an ability would be useful in providing a method to verify the actual results of a divide operation without the need to verify each mathematical step in the algorithm.

BRIEF SUMMARY OF THE INVENTION

An exemplary embodiment includes a method of verifying a result of a floating point division operation. The method includes: receiving a result of a floating point division operation for a dividend and a divisor; performing a comparison of a magnitude of a least significant bit (LSB) of the dividend and a magnitude of a most significant bit (MSB) of a remainder; and determining whether the result is correct based on the comparison.

Another exemplary embodiment includes a computer program product for verifying a result of a floating point division operation. The computer program product includes a computer-readable storage medium for storing instructions for executing a method comprising: receiving a result of a floating point division operation for a dividend and a divisor; performing a comparison of a magnitude of a least significant bit (LSB) of the dividend and a magnitude of a most significant bit (MSB) of a remainder; and determining whether the result is correct based on the comparison.

A further exemplary embodiment includes a system for verifying a result of a floating point division operation, the system includes: an instruction dispatching unit (IDU) for sending an instruction to perform a division operation for a dividend and a divisor; and a processor in operable communication with the IDU. The processor performs: receiving the instruction from the IDU; calculating a result of a floating point division operation for the dividend and the divisor; performing a comparison of a magnitude of a least significant bit (LSB) of the dividend and a magnitude of a most significant bit (MSB) of a remainder; and determining whether the result is correct based on the comparison.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides a method, system and computer program product for verifying a result of a floating point division operation. The method inspects the floating point result's corresponding remainder and compares the remainder to the dividend used in the operation in order to verify correctness of the result.

The methods described herein are provided for use with algorithms such as those described herein. For example, the methods described herein may be used with algorithms such as the non-restoring SRT and estimation algorithms described herein, the Newton-Raphson and Goldschmidt algorithms, and any other iterative algorithms that implement floating point divide.

The methods described herein may be used in conjunction with any suitable floating point number formats or standards. In one example, floating point numbers may be represented using the IEEE 754 standard. This standard allows for a consistent and uniform way to represent binary floating point numbers, by breaking down a number into a sign field, an exponent field and a fraction field. Numbers represented using this standard are referred to herein as "IEEE floating point numbers". In another example, floating point numbers may also be represented using the decimal floating point format as specified, e.g., in Chapter 20 of "IBM® z/Architecture Principles of Operation," Publication No. SA22-7832-05, 6th Edition, April 2007, which is hereby incorporated herein by reference in its entirety.

The algorithms and methods described herein may be implemented in any suitable processor or other hardware. An example of such hardware is IBM (International Business Machines) Corporation's Z-Series Binary Floating Point Unit (FPU). Another example is a PowerPC processor (e.g., generation P6) binary FPU. Both units are pipelined fused multiply-add units that may be modified to also provide other functions, such as instructions that convert numbers between integer and floating point formats.

Figure 1:
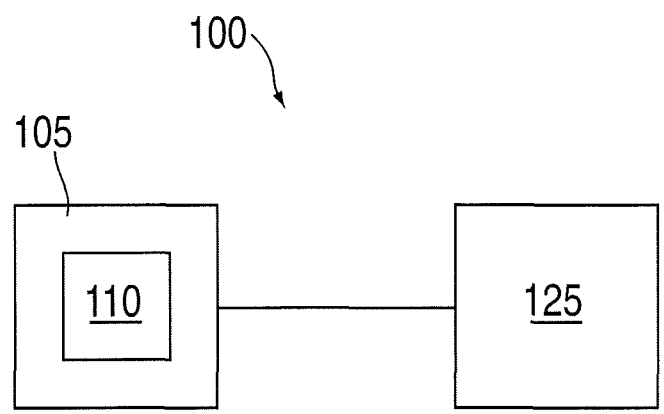
FIG. 1 is an exemplary embodiment of a system for performing methods described herein.

FIG. 1 depicts a system 100 suitable for implementing the method for verifying a result of a floating point division operation. The system 100 includes a microprocessor 105 or other processor, such as a FPU or a central processing unit (CPU) which includes a processor function 110 for performing the method. The system also includes an optional instruction dispatching unit (IDU) 125 for receiving information from the microprocessor 105 and dispatching instructions to the microprocessor 105. The system 100 described herein is merely exemplary. The system may include any additional components as necessary to provide for processing of data. Exemplary components include, without limitation, storage, memory, input devices, output devices and the like. As these components are known to those skilled in the art, these are not depicted in any detail herein.

The following is an example of an algorithm for floating point division of a dividend (described below as "a") and a divisor (described below as "b"), which may be used by any suitable execution unit, such as a FPU or other processor. An example of an algorithm for use in conjunction with the method described herein, is described below, and is referred to herein as the "Floating Point Divide" algorithm. The floating point divide algorithm may be used to divide the dividend a by the divisor b, to produce a floating point result, referred to as a quotient "Q".

The floating point divide algorithm described here first generates an initial estimate of a reciprocal of the divisor b. This estimate is then multiplied by the dividend a to form an estimate of the quotient. An error value corresponding to the estimate of the reciprocal of b is calculated, and then used in a series of fused-multiply-add instructions to iterate on that quotient estimate to generate a Taylor series approximation of the quotient with a desired or maximum precision.

Depending on the number of iterations performed, and the nature of the dataflow, it is possible to generate very high precision results. Each iteration represents a group of independent operations that is only dependent on the results from the previous iterations. As such, a given group of instructions per iteration can be executed in any order (or simultaneously given multiple execution units or multiple threads), thereby maximizing the efficiency of a given dataflow design.

This example includes the following exemplary procedure for calculating the quotient Q, based on an inputted dividend a and divisor b, using the reciprocal estimate "x0". In this example, the reciprocal estimate of b has about 14 bits of precision, although the initial reciprocal estimate, in other examples, may have a different precision.

The exemplary procedure includes the following steps or passes. The following steps or passes are not limited to those described in the example below. The number of passes, including the number of successive estimations of the reciprocal and the quotient, are not limited, and may include any number required to achieve a desired quotient precision.

In a first pass, the following operation is performed to calculate an initial reciprocal estimate "x0":
1. $x0=\sim 1/b$; compute reciprocal estimate of b, which has a precision of about 14 bits.

In a second pass, the following operations are performed to calculate an initial error "e0" introduced by the reciprocal estimate x0 and a first order quotient "q0":
1. $e0=1-x0*b$; compute error e0, which has a magnitude of about $2^{-14}$.
2. $q0=a*x0$; compute quotient q0, which has a precision of about 14 bits.

In a third pass, the following operations are performed to calculate a second order quotient "q1":
1. $e1=e0^2$; compute a second error e0.
2. $q1=q0+q0*e0$; compute second order quotient q1, which is about 28 bits precise.

In a fourth pass, the following operation is performed to calculate a third order quotient "q2":
1. $q2=q1+q1*e1$; compute third order quotient q2, which is about 56 bits precise.

At this point in the algorithm, the quotient q2 has about 56 bits correct in the quotient, i.e., has a precision of about 56 bits. In order to produce a quotient having more correct bits, i.e., having a greater precision, additional passes may be performed to produce higher order quotients, up to a maximum quotient precision set by the algorithm. As described above, any floating point divide algorithm may be used to produce this type of quotient. In many cases, additional steps are needed to properly round the result.

Figure 2:
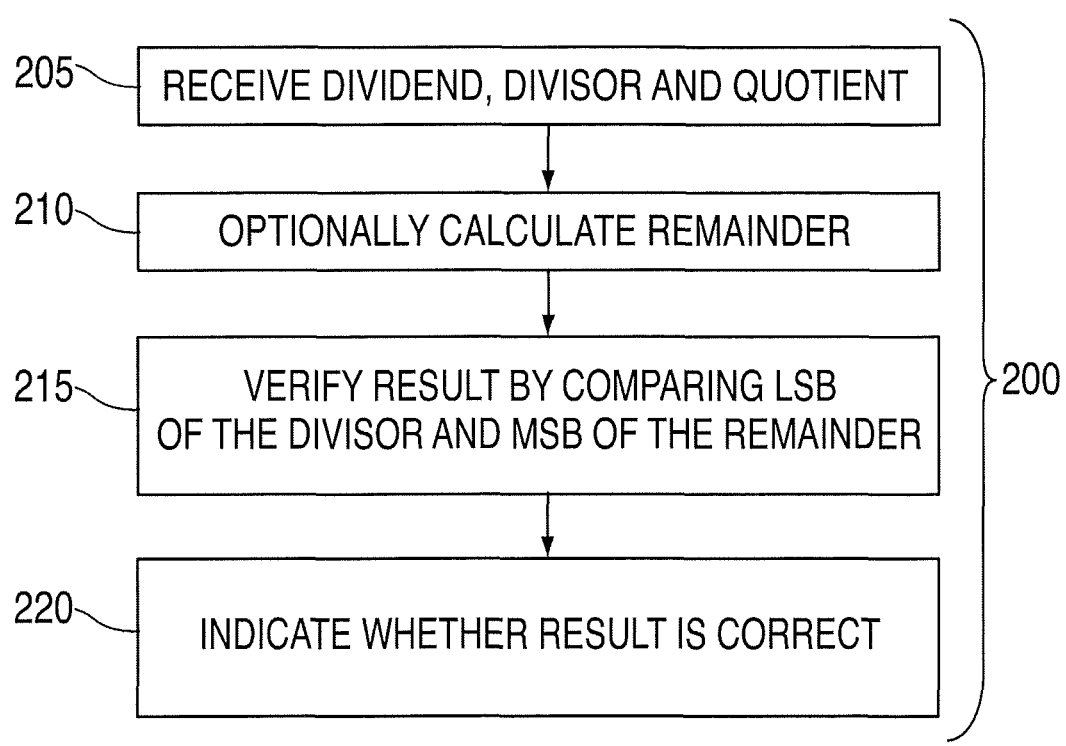
FIG. 2 is a flow chart providing an exemplary method for detecting errors in a result of a floating point divide operation.

Referring to FIG. 2, there is provided a method 200 for verifying a result of a floating point divide operation. The method 200 includes one or more stages 205, 210, 215 and 220. The method 200 is described herein in conjunction with the microprocessor 105, such as a FPU, although the method 200 may be performed in conjunction with any type, number and configuration of processors.

In the first stage 205, the processor, FPU or other hardware, receives data for two operands, i.e., a dividend and a divisor. The processor also receives data in the form of a result of a floating point divide operation for the dividend and the divisor, such as a result calculated from the algorithms described herein. In one embodiment, the processor receives only the dividend and the divisor, and performs the floating point divide operation to calculate the result. Such calculation may be in response to an instruction from another processor or logical unit, such as the IDU 125.

In one embodiment, the result includes a quotient and/or a remainder calculated by the floating point divide operation.

In one embodiment, the remainder is calculated as part of the floating point divide operation, which is performed by the processor or a separate processing unit. In another embodiment, the remainder is separately calculated based on the quotient received as the result of the operation, the divisor and the dividend.

In the optional second stage 210, the remainder is calculated based on the values of the dividend, the divisor and the quotient.

In one embodiment, the remainder is calculated based on the following equation:

$$Rem = a - q2t*b,$$

where "q2t" is the quotient q2 (or any quotient) computed by an algorithm that has been truncated or rounded to a desired output precision, "a" is the dividend, and "b" is the divisor.

The remainder may be calculated as part of the present method, may be calculated as part of the floating point algorithm, or otherwise calculated by the processor or separately provided to the processor. For example, the remainder may be calculated to be in compliance with the IEEE binary floating point standard rounding modes, by which it may be necessary to perform a remainder calculation to ensure correct rounding. This remainder may be calculated as described above. If the remainder has not been previously calculated, the processor calculates the remainder for use in following stages of the method.

In the third stage 215, after the remainder has been computed, the value of twice the magnitude of the least significant bit (LSB) position of the dividend fraction is then compared to the magnitude of the most significant bit (MSB) position of the remainder. The actual values of the LSB and MSB need not be considered. Even if they are zeroes, only the values of their bit positions are important.

In one embodiment, to simplify the method, the magnitude of the LSB position of the dividend is obtained solely from the exponent of the dividend, and the magnitude of the MSB of the remainder is the exponent of the remainder. Thus, in this embodiment, only the exponents of the dividend and the remainder are compared.

If the relative value of the magnitude of the remainder's MSB is larger than twice that of the dividend's LSB then an error is considered to have occurred. Likewise, if the relative value of the magnitude of the remainder's MSB is less than or equal to twice that of the dividend's LSB, then the result is meaningful and is considered to be correct.

In one example, for instructions regarding double precision (64 bit) IEEE binary floating point numbers, the fraction of the dividend has 52 bits, and therefore the magnitude of the dividend's LSB position corresponds to an exponent that is 52 less than the exponent of the dividend. Twice that magnitude therefore corresponds to an exponent that is 51 less than the exponent of the dividend. Thus, the method in this example consists of determining whether the remainder exponent is less than or equal to the dividend exponent minus 51. If so, then the quotient is considered correct. In another example, for single precision instructions in which the fraction of the dividend has 23 bits, the remainder exponent must be less than or equal to the dividend exponent minus 22 for the quotient to be considered correct.

In one embodiment, the result is assumed to be correct even if the actual result may be very close to, but not exactly equal to, the desired result. In this embodiment, the result is considered correct if this method determines that the result is within a selected error. For example, it may be more expedient to calculate the remainder using the value of the quotient truncated to the required precision, before it is properly rounded. This would increase the size of the remainder, which is one reason why it is allowed to be up to twice the magnitude of the dividend's LSB position. Since a purpose of this method is to determine if a defect has occurred, it may be assumed that such a defect would likely incur a much more significant error in the value of the quotient, resulting in a remainder of much greater magnitude.

In a fourth stage 220, the processor, after determining whether the quotient is correct based on the above comparison, may indicate to a user or another logical unit the result of the comparison. In other words, the processor may provide an indication as to whether the quotient is correct, or whether an error occurred in the divide operation.

The following example provides an example of a comparison of the LSB of the dividend and the MSB of the remainder, as described in conjunction with stage 215. This comparison demonstrates that the above conditions may be used to show that the quotient is accurate to within a selected error, i.e., an error having a magnitude that is less than a magnitude of a least significant bit of the quotient. This example is further described in the exemplary computation of the quotient "q2" described above.

In this example, dividend a and divisor b each have 53 bits, and are presented in the form:

1.xxxx ... *$2^y$ (i.e. an IEEE binary floating point number).

If a quotient "Q" is to be calculated with infinite precision and the remainder is to be computed on hardware that could deal with infinitely long operands, then the remainder would be equal to 0. Since this is not possible, this example will restrict the quotient magnitude to 53 bits (also in the form of an IEEE binary floating point number). As shown in the above algorithm, q2 has about 56 bits of precision. If the quotient q2 is truncated to 53 bits, q2 may be represented as the infinitely precise quotient Q plus some error "et". Thus, the quotient q2 can be represented by the following:

$q2=Q+et$, where "Q" is the infinitely precise quotient and where $|et|<|Q|*2^{-52}$. As referred to herein, "et" is the error resulting from the truncation of quotient Q, i.e., the truncation error, and "|et|" refers to the absolute value of et.

The remainder may be expressed by the following equation:

$Rem=a-q2*b$, which may be expressed, based on the equation for q2, as the following:

$Rem=a-(Q+et)*b$, which may alternatively be expressed as:

$|Rem=a-Q*b-et*b$.

Because, in this example, Q is infinitely precise, a−Q*b=0, and the resulting equation for the remainder may be expressed as:

$Rem=0-et*b$.

Accordingly, the absolute value of the remainder may be represented as:

$|Rem|=|et|*|b|$.

Because $|et|<|Q|*2^{-52}$, the remainder may be represented as:

$|Rem|<(|Q|*2^{-52})*|b|$, which may alternatively be expressed as:

$|Rem|<(|Q*b|*2^{-52})$, and may be further expressed as:

$|Rem|<(|a|*2^{-52})$.

As mentioned above, the dividend a is 53 bits in this example. As such, the magnitude of a's LSB position is equal to the exponent of a less 52. Consequently, twice the magnitude of a's LSB position is equal to the exponent of a less 51.

Therefore, if the truncated quotient (which in this example is 53 bits) has a correct precision up to its least significant bit (i.e., has an error with a magnitude of less than the least significant bit of the quotient), then the magnitude of the MSB of the remainder will be less than or equal to twice the magnitude of the LSB position of the dividend. In this example, the number of bits being reported with the quotient is equal to the number of bits in the dividend.

Technical effects and benefits include providing a method to efficiently verify that a result does not contain significant errors, while preserving processor performance. The method is particularly suited to detecting hardware malfunctions, electrical noise, or other disturbances that would cause a significant error independent of the algorithm design.

For floating point divide operations, it is possible to have a remainder which is orders of magnitudes greater than the divisor, whereas in integer (i.e., fixed point) divide, the remainder must be smaller in magnitude than the divisor. Some prior art verification methods take advantage of the fact that, if the quotient is the correctly rounded result, then the remainder must be smaller than either half of the dividend's LSB or the LSB itself, depending on the rounding mode.

However, this type of verification may not be practical without substantial loss of performance. In contrast, the methods described herein allow for the remainder to be calculated using the quotient value before it is properly rounded, and only requires that the remainder is smaller than twice the dividend's LSB. The methods are thus greatly simplified and thus aid in providing result verification without compromising performance.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of verifying a result of a floating point division operation, the method comprising:
    performing, by a division circuit, a floating point division operation for a dividend and a divisor to produce a final result of the floating point division operation, the final result including a quotient;
    providing the final result from the division circuit to a processor;
    after receiving the final result from the division circuit, calculating, by the processor, a remainder from the quotient produced by the floating point division operation;
    performing, by the processor, a comparison of a magnitude of a least significant bit (LSB) of the dividend and a magnitude of a most significant bit (MSB) of the remainder calculated based on the final result, the comparison including determining whether the magnitude of the MSB of the remainder is less than or equal to twice the magnitude of the LSB of the dividend; and
    determining whether the final result is correct based on the comparison.

2. The method of claim 1, wherein determining whether the final result is correct comprises determining that the final result is incorrect responsive to the magnitude of the MSB of the remainder being greater than twice the magnitude of the LSB of the dividend, and determining that the final result is correct responsive to the MSB magnitude being less than or equal to a value of twice the LSB magnitude.

3. The method of claim 2, wherein the final result is accurate within a selected error range.

4. The method of claim 3, wherein the error range has a magnitude that is less than a least significant bit of a quotient.

5. The method of claim 1, wherein the magnitude of the LSB is the exponent of the dividend less the number of bits of precision, and the magnitude of the MSB is the exponent of the remainder.

6. The method of claim 1, wherein the floating point division operation comprises a plurality of iterations, each of the plurality of iterations results in an estimated value of the result, and each successive iteration results in a successive estimated value having a greater precision than a previous estimated value.

7. A computer program product for verifying a result of a floating point division operation, the computer program product comprising:
    a non-transitory computer-readable storage medium for storing instructions for executing a method comprising:
    performing, by a division circuit, a floating point division operation for a dividend and a divisor to produce a final result of the floating point division operation, the final result including a quotient;
    providing the final result from the division circuit to a processor;
    after receiving the final result from the division circuit, calculating, by the processor, a remainder from the quotient produced by the floating point division operation;
    performing, by the processor, a comparison of a magnitude of a least significant bit (LSB) of the dividend and a magnitude of a most significant bit (MSB) of the remainder calculated based on the final result, the comparison including determining whether the magnitude of the MSB of the remainder is less than or equal to twice the magnitude of the LSB of the dividend; and
    determining whether the final result is correct based on the comparison.

8. The computer program product of claim 7, wherein determining whether the final result is correct comprises determining that the final result is incorrect responsive to the magnitude of the MSB of the remainder being greater than twice the magnitude of the LSB of the dividend, and determining that the final result is correct responsive to the MSB magnitude being less than or equal to a value of twice the LSB magnitude.

9. The computer program product of claim 8, wherein the final result is accurate within a selected error range.

10. The computer program product of claim 9, wherein the error range has a magnitude that is less than a least significant bit of a quotient.

11. The computer program product of claim 7, wherein the magnitude of the LSB is the exponent of the dividend less the number of bits of precision, and the magnitude of the MSB is the exponent of the remainder.

12. The computer program product of claim 7, wherein the floating point division operation comprises a plurality of iterations, each of the plurality of iterations results in an estimated value of the result, and each successive iteration results in a successive estimated value having a greater precision than a previous estimated value.

13. A system for verifying a result of a floating point division operation, the system comprising:
    an instruction dispatching unit (IDU) for sending an instruction to perform a division operation for a dividend and a divisor; and
    a division circuit in operable communication with the IDU, the division circuit configured to perform:
    receiving the instruction from the IDU; and
    calculating a final result of a floating point division operation for the dividend and the divisor, the final result including a quotient; and
    a processor configured to receive the final result from the division circuit and, after receiving the final result, perform an error detection operation including:

calculating a remainder from the quotient produced by the floating point division operation;

performing a comparison of a magnitude of a least significant bit (LSB) of the dividend and a magnitude of a most significant bit (MSB) of the remainder calculated based on the final result, the comparison including determining whether the magnitude of the MSB of the remainder is less than or equal to twice the magnitude of the LSB of the dividend; and determining whether the final result is correct based on the comparison.

14. The system of claim 13, wherein determining whether the final result is correct comprises determining that the final result is incorrect responsive to the magnitude of the MSB of the remainder being greater than twice the magnitude of the LSB of the dividend, and determining that the final result is correct responsive to the MSB magnitude being less than or equal to a value of twice the LSB magnitude.

15. The system of claim 13, wherein the magnitude of the LSB is the exponent of the dividend less the number of bits of precision, and the magnitude of the MSB is the exponent of the remainder.

* * * * *